Apr. 3, 1923.  
W. H. WYLIE  
PORTABLE LEVELING APPARATUS FOR MOUNTED MACHINERY  
Filed Nov. 7, 1922  
1,450,196  
3 sheets-sheet 2
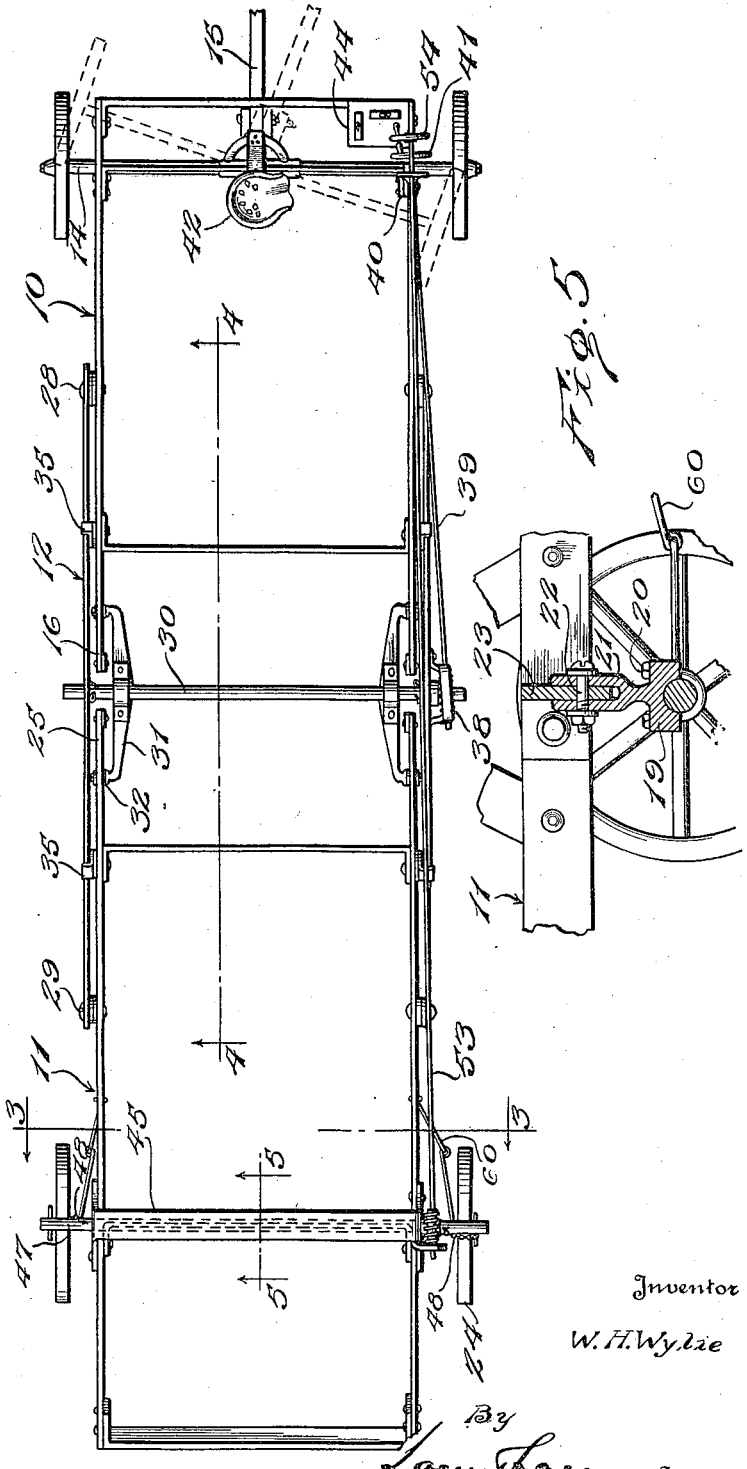

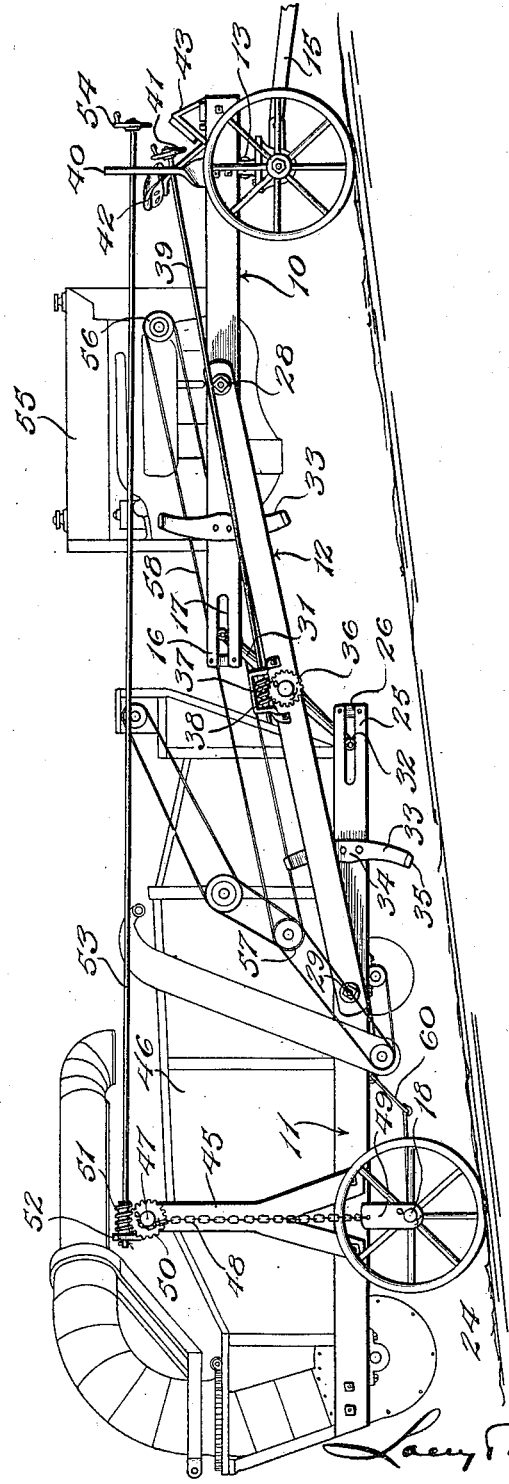

Apr. 3, 1923.
W. H. WYLIE
1,450,196
PORTABLE LEVELING APPARATUS FOR MOUNTED MACHINERY
Filed Nov. 7, 1922
3 sheets-sheet 3
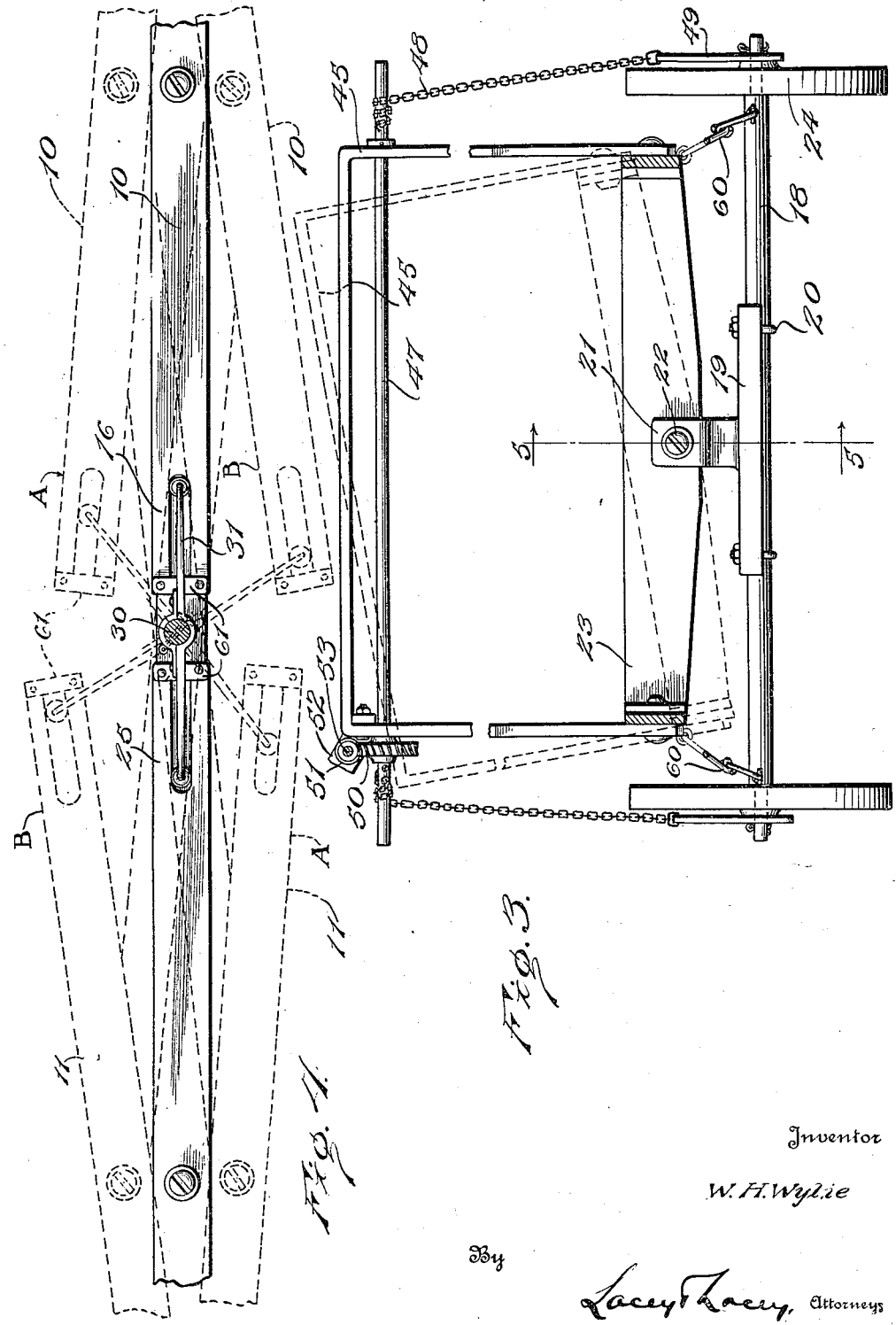
Inventor
W. H. Wylie
By
Lacey & Lacey, Attorneys Patented Apr. 3, 1923.

1,450,196

UNITED STATES PATENT OFFICE.

WILLIAM HENRY WYLIE, OF JENNINGS, KANSAS.

PORTABLE LEVELING APPARATUS FOR MOUNTED MACHINERY.

Application filed November 7, 1922. Serial No. 599,548.

*To all whom it may concern:*

Be it known that I, WILLIAM H. WYLIE, a citizen of the United States, residing at Jennings, in the county of Decatur and State of Kansas, have invented certain new and useful Improvements in Portable Leveling Apparatus for Mounted Machinery, of which the following is a specification.

This invention relates to a leveling apparatus for carrying portable farming implements, such as threshing machines and the like; such implements being intended to be operated while on the leveling apparatus. The main object of the invention is to furnish an apparatus of this class, by means of which the implement, carried thereby, may be leveled, independent of the sloping of the ground, in order to insure the proper functioning of the implement.

In the following, the apparatus has been described in connection with a threshing machine, but the right is reserved for using the apparatus with any other kind of implements, that are required to be set level in operation and are intended for use in the field or elsewhere.

This leveling apparatus is constructed like a truck or wagon, with front and rear axles and a separate frame or platform for each of these axles. These frames are, preferably, of the same length and width and will accordingly meet half way between the two axles, and said frames are joined together by means of connecting bars, journaled approximately mid-way between the ends of each frame. These connecting bars carry a transverse shaft with wings engaged in the adjacent ends of the two frames in such a manner, that, when this shaft is turned in one direction, the wings will raise the front end of the rear frame and simultaneously lower the rear end of the front frame. This is accomplished by means of a suitable gearing operated from a hand wheel at the forward end of the front frame.

The rotation of the frames on their axles is such that, not only longitudinal oscillation is possible, of each frame on its axle, but also tilting sideways of the frames on their axles, may be effected. This is accomplished by means of another hand wheel with suitable gearing, and connected with a second transverse shaft, near the rear axle, which shaft, when revolved by the hand wheel, winds or unwinds chains attached to the rear axle, in such a manner, that the rear frame will be drawn down on one side and raised on the other side.

In this manner it will be possible to oscillate the two frames by turning the first hand wheel. With the front wheels, for instance, situated higher than the rear wheels, the front frame will be at a higher level than the rear frame. By using the second hand wheel, both frames may be tilted together in a transverse direction of the apparatus, and by using both hand wheels, it will now be clearly understood, that the frames may be leveled, no matter in what direction the ground slopes.

In the accompanying drawings, one embodiment of the invention is illustrated, and Figure 1 shows a side elevation of the apparatus carrying the threshing machine and placed on sloping ground with its front wheels higher than its rear wheels.

Figure 2 is a plan view of Figure 1.

Figure 3 is a transverse section on a larger scale along line 3—3 of Figure 2.

Figure 4 is a fragmentary side elevation of the frames, shown on a larger scale, and Figure 5 is a fragmentary section along line 5—5 of Figures 2 and 3.

The apparatus consists of three main parts, namely a front frame 10, a rear frame 11, and connecting bars 12. Each of the frames is, preferably, constructed of structural iron such as channel or angle bars or the like, suitably braced and each connected with their axles to be able to turn in longitudinal and transverse direction thereon. The front frame 10 has, for this reason, a universal joint 13, secured in the middle of the front axle 14, this joint permitting tilting both in longitudinal and transverse directions of the frame, as well as turning in a horizontal direction with regard thereto. At 15 is shown a draw-bar or tongue, by which the apparatus may be propelled from a tractor or drawn by horses.

The front frame 10 terminates at its rear end with spaced fingers 16, forming a slot 17 with parallel sides, the use of which will be described further on.

The rear frame 11 is of the same construction and is secured on the rear axle 18 by means of a bracket 19, rigidly held by bolts 20. This bracket 19 has an upwardly directed arm 21, in which a pintle 22 is carried, permitting side tilting of the beam 23, forming part of the frame 11. It will thus be seen that the rear frame can obtain its tilting from side to side around the axis of the pintle 22, while it may oscillate in longitudinal direction of the apparatus around the axis of the rear axle 18, turning in the rear wheels 24. The rear frame is also provided with fingers 25, forming between them a slot 26 with parallel sides. It should here be noted that the distance from the rear axle to the forward end of the fingers 25, is exactly the same as the corresponding distance to the rear end of the fingers 16 from the front axle 14.

The front and rear frames are connected by means of the side bars 12, one on each side of the frames. These bars have their ends journaled as at 28 and 29, on the front and rear frames respectively. The journaled points 28 and 29 are so situated that the distance from the ends of fingers 16 to the journal point 28 is the same as the distance between the ends of fingers 25 and the journal point 29 on the rear frame. The length of each frame, measured from its wheel axle to the ends of its fingers, is exactly the same in both frames.

Reference numeral 30 represents a shaft running transversely to the apparatus and revolvably mounted in the said bars 12, at a medial point between the journals 28 and 29. It should be noted by referring to Figure 2, that the ends of the fingers 16 are placed sufficiently far from the ends of fingers 25, to clear the shaft 30. A pair of wings 31 are carried near each end of the transverse shaft 30 and rigidly attached thereto, so as to partake in the turning movement of the shaft. These wings stand, normally, in a horizontal position, see Figure 4, when the front and rear frames are in alinement. Each wing terminates with a short journal 32 engaging in one of the slots 17 or 26, formed between the fingers 16 and 25, respectively, as seen in Figures 1, 2, and 4; the wings 31 are of the same length, so that they will communicate the same angular oscillation to the front and rear frames around their respective wheel axles, when the transverse shaft 30 is turned in either direction. It will, accordingly, be clear, particularly by referring to Figure 4, that, when the wings 31 are turned out of their horizontal position, as indicated by full lines in this figure, with, for instance, the forwardly directed wings 31 turned upwardly in the position shown at "A"; the fingers of the front frame will be raised above the axis of the transverse shaft 30 the same amount as the fingers on the rear frame 11 will be lowered, and that, consequently, the frames will remain parallel whatever angular position the wings take. With the forward wings 31 turned down as indicated at "B" in Figure 4, the front frame 10 will then be lowered and the rear frame 11 raised. In order not to exceed a suitable oscillation of the frames, arcuate arms or horns 33 are provided for each frame, rigidly secured thereto, as at 34. These horns extend above and below each frame the same amount and terminate with suitable ledges 35 adapted to engage the top and bottom edges of the connecting bars 12, in this manner limiting the permissible movement up and down of the ends of the frames.

At one end of the shaft 30 is secured a worm gear 36 meshing with the worm 37 carried in suitable bearings 38 on one of the connecting bars 12. This worm is secured on an operating rod 39, which runs forwardly from the worm and is supported at its forward end in a standard 40, provided at the forward end of the front frame 10. The rod 39 is mounted therein in such a manner that axial displacement as well as side oscillation may take place when the rod 39 is turned, by means of the operating wheel 41, secured at its extreme end.

The hand wheel 41 is placed in a suitable position to be reached by the operator of the apparatus and a seat 42 as well as a foot rest 43, is preferably furnished for him. At 44 is shown a small bracket carrying a pair of levels, one for observing the angular position of the platform in longitudinal direction and another level for observing its position in transverse direction. The seat is preferably turned slightly round to one side for easy reach of the hand wheel 41 by the operator.

Reference numeral 45 represents a yoke of the width of the rear frame and of a height sufficient to permit installation of a threshing machine 46 to be placed under it and secured to the rear frame, see Figure 3. This yoke 45 carries, at its upper end, a transverse shaft 47 revolvably mounted therein. The ends of this shaft extend beyond the upright sides of the yoke 45 and each carries a chain or a wire rope 48 securely fastened thereto, see Figure 3, and wound a few times around the respective ends of shaft 47, one chain in right hand direction and the other chain in left hand direction. The lower ends of each chain 48 is secured to an arm 49 journaled on the end of the wheel axle 18. At 50 is shown a worm wheel rigidly attached to the transverse shaft 47, meshing with the worm 51, carried in a suitable bearing 52, secured on the yoke 45. This worm 51 is mounted at the end of an operating rod 53, which extends to the forward end of the apparatus and is carried in a bearing in the standard 40, in the same manner as fully described in connection with the operating rod 39. This second operating rod 53 extends beyond the standard and carries an operating hand wheel 54 at its extreme end. By turning the hand wheel 54, the worm 51 will be revolved to actuate the worm wheel 50, which thereupon turns the transverse shaft 47 and unwinds one and winds up the other of the chains 48, so that in this manner the yoke 45 together with the rear frame 11, will be tilted in the direction of the taut chain 48. This tilting is communicated to the front frame 10 through the intermediary of the connecting bars 12 and the shaft 30, with its wings 31.

At 55, see Figure 1, is indicated a motor for driving the threshing machine 36. The motor 55 carries a pulley 56 which connects with the corresponding pulley 57 on the threshing machine through the intermediary of a belt 58. The distance between the axes of the pulleys 56 and 57 has to be the same as the distance between the axes of the journals 28 and 29, while the lines connecting each pair of said axes, must be parallel, and the distance between the axis of the journal 28 and the pulley 56 should be the same as the distance between the axis of the journal 29 and the pulley 57. In this manner the length of the belts 58 or distance between the two axes at 56 and 57 will remain the same as the distance between the journals 28 and 29, independent of what angular position the front and rear frames take.

The use of the apparatus is as follows:

Supposing that the threshing machine is running up on the slope of a hill and that the shock that is going to be threshed is approached by the leveling apparatus, in an approximately straight line from the bottom of the hill, the apparatus is then positioned conveniently near the shock, having the front wheels higher than the rear wheels. It will now be evident, that the threshing machine does not stand level, but inclined, approximately the same amount as the slope of the hill. In order now to give the threshing machine a level position, it will be necessary to lower the forward end and raise the rear end of the rear frame. This is accomplished by turning the operating wheel 41 until the longitudinal level at 44 shows the front frame to be in level position. As both frames, for the reason already given, are bound to move the same angular amount, the rear frame will accordingly also stand in a horizontal position, thereby leveling the threshing machine 46.

Should the leveling apparatus, on the other hand, approach the shock sideways on the hill, that is to say, if for instance, the right side of the apparatus stands higher than the left side, then the operating wheel 54 is turned until the level at 44 shows the front frame 10 in level position. As both front and rear frames 10 and 11 tilt together in transverse direction, the threshing machine 46 will now have taken up a horizontal position with the frames.

Should, again, not only the front wheels be situated higher than the rear wheels but one side of the apparatus be higher than the other, then both hand wheels 41 and 54 are turned until the longitudinal as well as the transverse levels at 44 show the frames to stand horizontally, when, again, the threshing machine will take up a level position, which is most advantageous for its operation.

It may here be noted, that the length of the rear frame behind the rear axle and the length of the front frame beyond the front axle may vary to suit conditions. The distance from the front axle to the journal 28 should, however, be the same as the distance from the rear axle to the journal 29; furthermore, the length of the front frame in rear of the front axle should be the same as the length of the rear frame in front of the rear axle; furthermore, the transverse shaft 30 must be placed midway between the two journal points 28 and 29, and lastly, the length of the wings 31 must be the same.

Links 60 are provided between the rear axle 18 and the rear frame 11 in order to prevent jolting of the axle, when traveling over rough ground. These links must be loose or slackened when the apparatus is being leveled, but may be tightened during transportation.

Across the slots 17 and 26 are secured clips 61 for strengthening the fingers 16 and 25.

Besides the motor 55, other necessary machinery such as a feeder (not shown) may be carried on the front frame 10.

I claim:

1. A leveling apparatus of the class described comprising a front frame having a front axle and a rear frame having a rear axle, each frame being mounted to oscillate on its respective axle; connecting members for said frames, said members being journaled at their ends in the respective frames, and means carried by said members for altering the relative position of said frames.

2. A leveling apparatus of the class described comprising a front frame having a front axle and a rear frame having a rear axle, each frame being mounted to oscillate on its respective axle; connecting members for said frames, said members having journals at their ends mounted in the respective frames, and means, carried by said members for altering the angular position of said frames; said journals being situated on the front frame at the same distance back from the front axle as the journals on the rear frame from the rear axle.

3. A leveling apparatus of the class described comprising a front frame having a front axle and a rear frame having a rear axle, each frame being mounted to oscillate on its respective axle; connecting members for said frames, said members having journals at their ends mounted in the respective frames, and means, carried by said members for altering the angular position of said frames; said journals being situated on the front frame at the same distance back from the front axle as the journals on the rear frame from the rear axle; said means including a transverse shaft revolvably mounted in said members medially thereof and a suitable connection between said shaft and the respective adjacent ends of said frames.

4. A leveling apparatus of the class described comprising a front frame having a front axle and a rear frame having a rear axle, each frame being mounted to oscillate on its respective axle; connecting members for said frames, said members having journals at their ends mounted in the respective frames, and means, carried by said members for altering the angular position of said frames, said journals being situated on the front frame at the same distance back from the front axle as the journals on the rear frame from the rear axle; said means including a transverse shaft revolvably mounted in said members, medially thereof and wings on said transverse shaft connecting respectively with the adjacent ends of said front and rear frames.

5. A leveling apparatus of the class described comprising a front frame having a front axle and a rear frame having a rear axle, each frame being mounted to oscillate on its respective axle; connecting members for said frames, said members having journals at their ends mounted in the respective frames, means, carried by said members, for altering the angular position of said frames, said journals being situated on the front frame at the same distance back from the front axle as the journals on the rear frame from the rear axle; said means including a transverse shaft revolvably mounted in said members medially thereof, and wings on said transverse shaft connecting respectively with the adjacent ends of said front and rear frames, and having slidable connection therewith.

6. A leveling apparatus of the class described comprising a front frame having a front axle and a rear frame having a rear axle, each frame being mounted to oscillate on its respective axle; connecting members for said frames, said members having journals at their ends mounted in the respective frames; means, carried by said members for altering the angular position of said frames, said journals being situated on the front frame at the same distance back from the front axle as the journals on the rear frame from the rear axle, said means including a transverse shaft revolvably mounted in said members medially thereof, wings on said transverse shaft connecting respectively with the adjacent ends of said front and rear frames, having suitable connections therewith; and suitable gearing for actuating said transverse shaft.

7. A leveling apparatus of the class described comprising a frame having a front axle and a rear axle, said frame being mounted to oscillate upon said axles in transverse direction of the apparatus; means for altering the angular position with regard to the axles, said means including a yoke erected upon said frame; a transverse shaft, revolvably mounted in said yoke, and a chain connection between each of the ends of said shaft and the adjacent ends of one of said axles, said chains being wound in opposite direction upon the respective ends of said shaft.

8. A leveling apparatus of the class described comprising a frame having a front axle and a rear axle, said frame being mounted to oscillate upon said axles in transverse direction of the apparatus; means for altering the angular position with regard to the axles, said means including a yoke erected upon said frame, a transverse shaft, revolvably mounted in said yoke, a chain connection between each of the ends of said shaft and the adjacent ends of one of said axles, said chains being wound in opposite direction upon the respective ends of said shaft: and a suitable gearing for turning said shaft.

9. A leveling apparatus of the class described comprising a front frame having a front axle and a rear frame having a rear axle, said frames being mounted to oscillate longitudinally and transversely on their respective axles; connecting members for said frames, being journaled at their ends in the respective frames; means, carried by said members for altering the relative position of said frames in longitudinal direction of the apparatus; and other means for changing the angular position of the frames in transverse direction of said apparatus.

10. A leveling apparatus of the class described comprising a front frame having a front axle and a rear frame having a rear axle, said frames being mounted to oscillate longitudinally and transversely on their respective axles: connecting members for said frames, being journaled at their ends in the respective frames; means, carried by said members for altering the relative position of said frames in longitudinal direction of the apparatus; and other means for changing the angular position of the frames in transverse direction of said apparatus, one of said frames being adapted to carry a farming implement.

In testimony whereof I affix my signature.

WILLIAM HENRY WYLIE. [L. S.]